United States Patent [19]

Fukuhara et al.

[11] Patent Number: 4,621,707

[45] Date of Patent: Nov. 11, 1986

[54] CONTROL SYSTEM FOR A FOUR WHEEL DRIVE VEHICLE

[75] Inventors: Yuichi Fukuhara, Toyota; Hiroyuki Mizutani, Chiryu; Takeshi Fuchigami, Hekinan, all of Japan

[73] Assignee: Aisin Seiki Kabushiki Kaisha, Kariya, Japan

[21] Appl. No.: 703,560

[22] Filed: Feb. 20, 1985

[30] Foreign Application Priority Data

Mar. 28, 1984 [JP] Japan .................. 59-045463[U]

[51] Int. Cl.$^4$ ........................................... B60K 17/34
[52] U.S. Cl. .................................................. 180/247
[58] Field of Search ............... 180/247, 248, 233, 249, 180/250, 197

[56] References Cited

U.S. PATENT DOCUMENTS

| 4,381,828 | 5/1983 | Lunn et al. | 180/247 |
| 4,433,748 | 2/1984 | Satoh | 180/247 |

FOREIGN PATENT DOCUMENTS

| 0152624 | 11/1980 | Japan | 180/248 |
| 2065244 | 6/1981 | United Kingdom | 180/247 |
| 2118666 | 11/1983 | United Kingdom | 180/233 |
| 1039746 | 9/1983 | U.S.S.R. | 180/233 |

Primary Examiner—David M. Mitchell
Assistant Examiner—Mark C. Dukes
Attorney, Agent, or Firm—Burns, Doane, Swecker & Mathis

[57] ABSTRACT

A control system for a four wheel drive vehicle is disclosed which either prevents the transmitting of the power of an internal combustion engine incorrectly or gives a warning signal indicative of incorrect operation. The control system includes two sensors for separately detecting the rotational frequency of front and rear propeller shafts, a control circuit for determining the rotational frequency difference between the front and rear propeller shafts and for generating control signals relative to a predetermined set point. A contact or a switch is operated by the control circuit. In one embodiment, an alarm buzzer and an alarm lamp are also provided.

6 Claims, 2 Drawing Figures

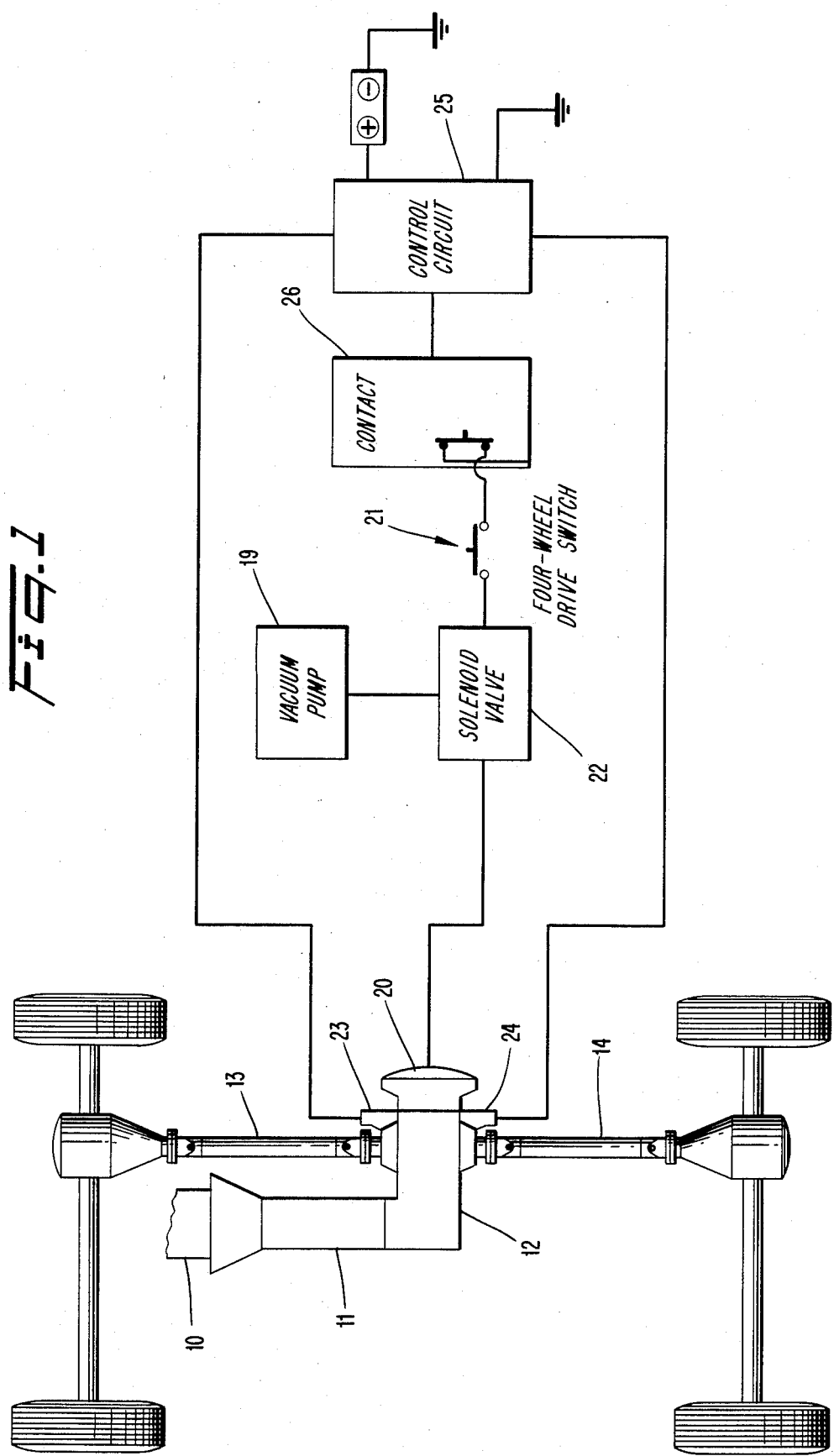

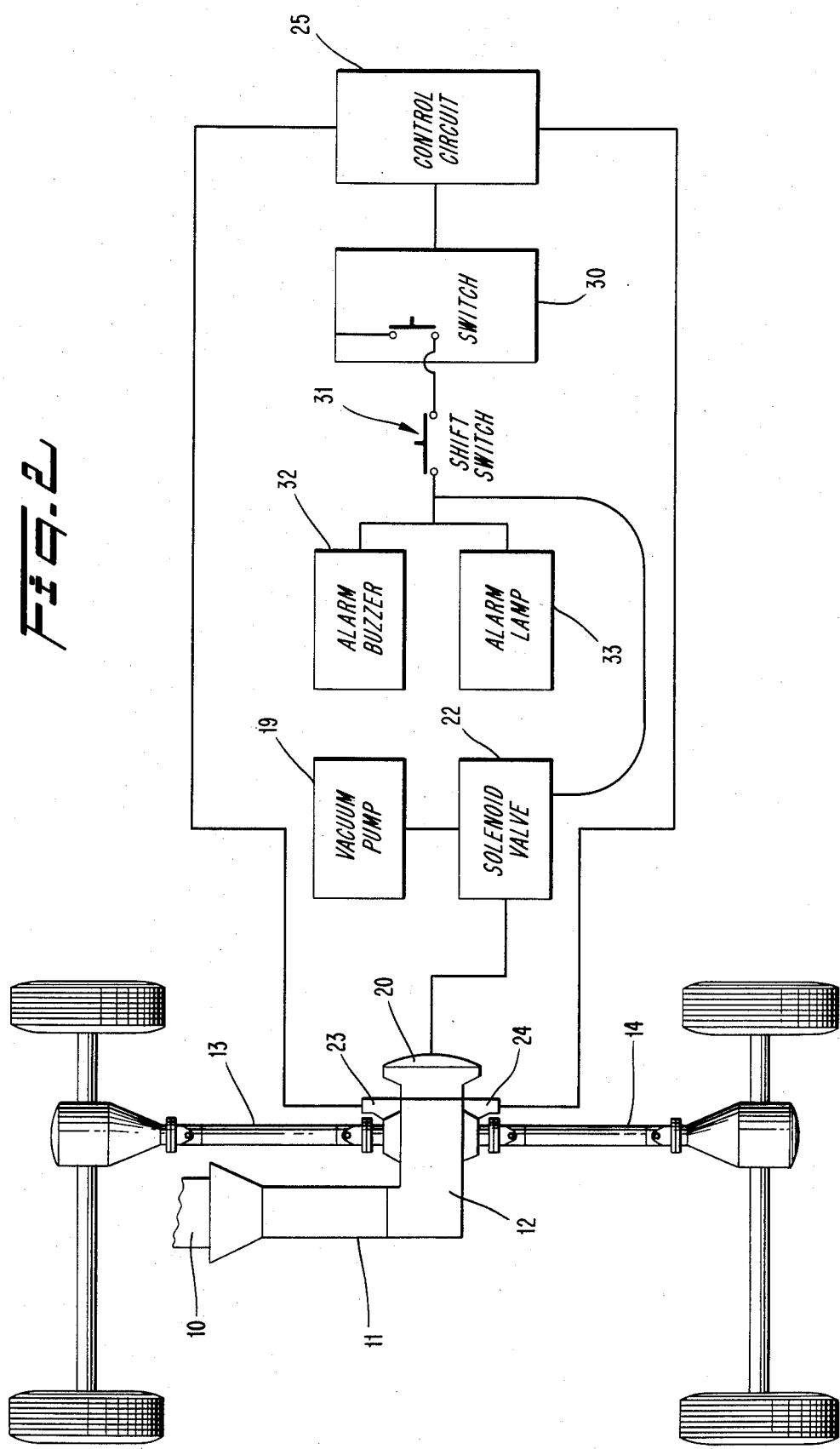

CONTROL SYSTEM FOR A FOUR WHEEL DRIVE VEHICLE

BACKGROUND OF THE INVENTION

1. Field of the Invention

The present invention relates to a control system for a four wheel drive vehicle and more particularly to a control system for preventing a four wheel drive mechanism from incorrect transmission of the power of an internal combustion engine or for generating warning signals upon such incorrect operation.

2. Description of the Prior Art

Conventionally a four wheel drive mechanism has a transfer, a front propeller shaft, a rear propeller shaft and a power assist arrangement communicating with a vacuum pump through a solenoid valve. The power of an internal combustion engine is selectively transmitted through the transfer to the front propeller shaft and/or the rear propeller shaft.

When the power delivered to either the front or rear propeller shaft is transmitted at speed to both front and rear propeller shafts, a drive hub comes in contact with a splined chamfer of a sleeve. The contact between the hub and the splined chamfer generates noise or strange sounds, causes increased wear on the parts and may destroy part of the contacting surfaces.

SUMMARY OF THE INVENTION

It is an object of the present invention to provide a control system which prevents the incorrect operation when the power is being transmitted to either the front or rear propeller shaft.

It is another object of the present invention to provide a control system which gives a warning signal against the incorrect operation when the power is being transmitted to either the front or rear propeller shaft.

It is yet another object of the present invention to provide a control system which prevents a drive hub from coming in contact with a splined chamfer of a sleeve at an improper time.

These objects and others are achieved by a control system according to the present invention. A first embodiment of the control system includes a sensor for detecting a rotational frequency of a front propeller shaft, a sensor for detecting a rotational frequency of a rear propeller shaft. The control system further includes a control circuit for determining the difference in rotational frequency between the front propeller shaft and the rear propeller shaft and for generating control signals as compared with a set point. A contact is operated by the control circuit.

In accordance with another embodiment of a control system according to the present invention, the system includes a sensor for detecting a rotational frequency of a front propeller shaft, a sensor for detecting a rotational frequency of a rear propeller shaft, a control circuit for determining the difference in rotational frequency between the front propeller shaft and the rear propeller shaft and for generating control signals as compared with a set point. A switch is operated by the control circuit and an alarm buzzer and an alarm lamp are provided for indicating improper operation.

BRIEF DESCRIPTION OF THE DRAWINGS

Preferred embodiments including the features and advantages of the present invention will be described in greater detail with reference to the accompanying drawings wherein, like members bear like reference numerals, and wherein:

FIG. 1 is a diagrammatic illustration of a first embodiment of the present invention; and FIG. 2 is a diagrammatic illustration according to a second embodiment of the present invention.

DETAILED DESCRIPTION OF THE PREFERRED EMBODIMENTS

Referring to the attached drawings, especially FIG. 1, a control system includes sensors 23 and 24, a control circuit 25 and a contact 26 serially connected to one another in order to provide a control system for an automatic type four wheel drive vehicle having a power assist. A transfer 12 for transmitting the power of an internal combustion engine 10 selectively joins a transmission 11 to one or both a front propeller shaft 13 and a rear propeller shaft 14 through use of the power assist means 20.

The transmission 11 is connected to the internal combustion engine 10, and the power assist means 20 is in communication with a vacuum pump 19 through a normally closed solenoid valve 22. The solenoid valve 22 is operated by activating a four wheel drive switch 21 to the closed position for automatically engaging the four wheel drive. Moreover, the sensors 23 and 24 for detecting the rotational frequency of one of the front propeller shaft 13 and the rear propeller shaft 14, respectively, are connected to the transfer 12.

The sensors 23 and 24 are connected to the control circuit 25, which is connected to the contact 26. The contact 26 is connected to the four wheel drive switch 21. The transfer 12 is operated by the power assist means 20, which is operated by negative pressure transmitted from the vacuum pump 19. The level of negative pressure is controlled by the solenoid valve 22.

The contact 26 is operated by the control circuit 25. The control circuit 25 distinguishes, i.e., determines, the rotational frequency difference between the front propeller shaft 13 and the rear propeller shaft 14 and generates control signals compared with a predetermined set point. For example, the set point preferably corresponds to a rotational frequency difference between the front and rear propeller shafts 13, 14 of 200 to 300 r.p.m. If the control circuit 25 generates signals that the rotational frequency difference is more than the set point, the control circuit 25 will turn off the contact 26. Alternatively, if the control circuit 25 generates a signal that the rotational frequency difference is less than the set point, the control circuit 25 will turn on the contact 26 or retain the contact 26 in the on position.

The operation of the above described control system will now be explained. In one operating condition, the power of the internal combustion engine 10 is transmitted via the transmission 11 and the transfer 12 to either the front propeller shaft 13 or the rear propeller shaft 14. Whenever the rotational frequency difference between the front propeller shaft 13 and the rear propeller shaft 14 is more than the set point, the control circuit 25 turns the contact 26 off. Turning off the contact 26 prevents flow of current through the four wheel drive switch 21 even if activated. Accordingly, the solenoid valve 22 remains closed and the vacuum pump 19 does not supply negative pressure to the power assist means 20. Therefore, the power assist means 20 does not operate the transfer 12, so the power of internal combustion engine 10 is not transmitted to the other propeller shaft.

With reference to FIG. 2, another embodiment of the present invention provides a control system including the sensors 23 and 24, the control circuit 25, a switch 30, an alarm buzzer 32 and an alarm lamp 33 which are interconnected to provide a control system for a manual shift type four wheel drive vehicle.

The sensors 23 and 24 for detecting the rotational frequency of the front propeller shaft 13 and the rear propeller shaft 14, respectively, are connected to the transfer 12. The sensors 23 and 24 are connected to the control circuit 25 which, in turn, is connected to the switch 30. The switch 30 is connected via a shift knob switch 31 to the alarm buzzer 32 and the alarm lamp 33. The operability of the switch 30 is controlled by the control circuit 25. The control circuit 25 determines the rotational frequency difference between the front propeller shaft 13 and the rear propeller shaft 14, and generates control signals compared with a predetermined set point. For example, the set point preferably corresponds to a rotational frequency difference between the front and rear propeller shafts of 200 to 300 r.p.m.

If the control circuit 25 generates a signal that the rotational frequency difference is more than the set point, the circuit 25 will turn on the switch 30. Alternately, if the control circuit 25 generates a signal that the rotational frequency difference is less than the set point, the control circuit 25 turns off the switch 30.

The operation of the above described control system (FIG. 2) will now be explained. The power of the internal combustion engine 10 is transmitted via the transmission 11 and the transfer 12 to either the front propeller shaft 13 or the rear propeller shaft 14. Whenever the rotational frequency difference between the front propeller shaft 13 and the rear propeller shaft 14 is greater than the set point, the control circuit 25 turns on the switch 30. Turning on the shift knob switch 31 in addition to turning on the switch 30, causes the alarm buzzer 32 to start to generate an alarm sound and the alarm lamp 33 to start to light. It should be noted that since the embodiment illustrated in FIG. 2 is designed for a manual shift type four wheel drive vehicle, the actuating shifting can occur even it the alarm buzzer and alarm signal are activated. i.e., shifting can be undertaken irrespective of the location of the contact 26.

While preferred embodiments of the present invention have been described in the foregoing application, variations and changes thereto will occur to those skilled in the art within the scope of the present inventive concepts. Accordingly, it is expressly intended that all such variations and changes which fall within the scope delineated by the following claims be embraced thereby.

What is claimed is:

1. A control system for a four wheel drive vehicle, comprising:
   a first sensor for detecting a rotational frequency of a front propeller shaft;
   a second sensor for detecting a rotational frequency of a rear propeller shaft;
   a control circuit for determining the rotational frequency difference between said front propeller shaft and said rear propeller shaft and for generating control signals relative to a predetermined set point;
   a contact actuated by said control circuit;
   the vehicle including an automatic shift type four wheel drive; and
   the control circuit preventing engagement of the four wheel drive when the frequency difference is greater than the predetermined set point.

2. The control circuit of claim 1, wherein the predetermined set point corresponds to a frequency difference of 200 to 300 revolutions per minute.

3. The control circuit of claim 1, further comprising a switch for engaging the automatic shift type four wheel drive arranged in series with said contact.

4. A control system for a four wheel drive vehicle, comprising:
   a first sensor for detecting a rotational frequency of a front propeller shaft;
   a second sensor for detecting a rotational frequency of a rear propeller shaft;
   a control circuit for determining the rotational frequency difference between said front propeller shaft and said rear propeller shaft and for generating control signals relative to a predetermined set point;
   a switch activated by said control circuit;
   signal means connected in series with the switch for generating a warning signal when the switch is activated;
   the vehicle including a manual shift type four wheel drive; and
   a shift switch for permitting manual engagement of the four wheel drive, said shift switch being arranged in series with said switch.

5. The control circuit of claim 4, wherein the control circuit closes the switch when the frequency difference is greater than the predetermined set point to activate the signal means.

6. The control circuit of claim 4, wherein the signal means comprises an alarm buzzer and an alarm lamp.

* * * * *